United States Patent
Randall

[11] 3,889,176
[45] June 10, 1975

[54] REACTIVE REGULATOR
[75] Inventor: Ronald Harold Randall, Cuba, N.Y.
[73] Assignee: ACME Electric Corporation, Cuba, N.Y.
[22] Filed: Oct. 10, 1973
[21] Appl. No.: 405,020

[52] U.S. Cl. .................. 323/8; 323/24; 323/34; 323/60
[51] Int. Cl. ............... G05f 1/12; G05f 1/46
[58] Field of Search ......... 323/8, 225 C, 24, 34, 45, 323/62, 60; 321/18, 25, 45 R

[56] References Cited
UNITED STATES PATENTS

| | | | |
|---|---|---|---|
| 3,129,381 | 4/1964 | Manteuffel | 323/8 X |
| 3,437,905 | 4/1969 | Healey et al. | 323/22 SC |
| 3,699,424 | 10/1972 | Hart et al. | 321/45 R |
| 3,745,437 | 7/1973 | Brown | 323/8 X |

Primary Examiner—A. D. Pellinen
Attorney, Agent, or Firm—Woodling, Krost, Granger & Rust

[57] ABSTRACT

A reactive voltage regulator of the shunt type which effectively has a linear inductance in series between input and output terminals and has separate capacitive and inductive reactances shunting the output terminal. A bidirectional switch such as a triac is connected in series with the inductive reactance. The current taken by this inductive reactance, in a preferred embodiment, may be approximately twice that taken by the capacitive reactance such that selective phase angle firing of the bidirectional switch establishes this shunt composed of the capacitive and inductive reactance as selectively either capacitive or inductive in effect. By varying the firing angle of the switch, with respect to the voltage across the shunt regulator circuit, the output voltage or current may be regulated. Alternatively, the series linear inductance and the inductive reactance may be incorporated into a single leakage reactance transformer, and the entire reactive regulator has special advantages when operated on three phase.

21 Claims, 11 Drawing Figures

PATENTED JUN 10 1975     SHEET 1     3,889,176

REACTIVE REGULATOR

BACKGROUND OF THE INVENTION

Voltage regulators have been in use for many years, and a common type is a rectifier producing a regulated Dc from an Ac voltage input. The phase of the firing angle of a controllable switch such as thyristor is controlled at a variable angle relative to the 180° point or negative going zero crossing point of the Ac voltage input. As one phases farther in advance of this 180° point, more current is supplied to the load; and hence the effective voltage supply to the load is increased. Such a phase shiftable rectifier however has very high harmonic content, and in recent years the telephone companies have been increasingly concerned about this high harmonic content reflected to the Ac lines. What is termed the T. I. F. is the telephone influence factor, wherein the Ac line harmonics adversely affect telephone performance and accordingly the telephone companies definitely prefer power supplies with low Ac line harmonics. Accordingly their bid specifications for new power supplies specify this low harmonic content.

One patentee has proposed the use of a leakage reactance transformer having the usual ferrocapacitor on one winding of this transformer. By selecting the firing angle of the bidirectional switch such as a triac, the leakage reactance transformer can be artificially controlled in flux reversal rather than the normal operation of self-saturation of the transformer. This artificially induced flux reversal has the effect of lowering the output voltage, and hence a regulated voltage can be obtained. However, such system is suitable primarily for single phase rather than three phase because of the essentially square wave output and high harmonic content from this essentially square wave caused by the rapid flux reversal. Accordingly the circuit is not suitable for three-phase high power outputs. Also the capacitive volt-amperes required by the patented system is similar to that of conventional ferroresonant regulators, approximately 1.5 to 1.7 times the Dc output watts. Also the emphasis of the patented system is on a square wave output voltage which is a disadvantage for three-phase operation in that it reflects a greater amount of harmonic currents to the input line current.

In the prior art ferroresonant voltage regulator the ferrocapacitor is used to resonate with the saturated inductance and quickly discharges through the saturating winding to recharge in the opposite polarity. The Ac output is effectively taken from the ferrocapacitor, and this output may be rectified to provide a Dc output. Other systems utilizing an Ac capacitor include use of a synchronous motor as a synchronous condenser for power factor correction. It has long been known that on long Ac power transmission lines there is series inductive reactance present on the transmission line inherently due to the length of the line. By placing a synchronous motor as a synchronous condenser floating across the line at the load end of this transmission line, and adjusting the motor to be overexcited, then the motor voltage becomes greater in magnitude than the supply voltage at the far end of the transmission line. This has been used to control the voltage at the load end of the transmission line because if the voltage at the load end tends to change, it may often be held substantially constant by varying the excitation of the synchronous condenser.

Accordingly, an object of the invention is to provide an electrical regulator with low Ac line harmonics, high power factor, high efficiency, and yet at reasonable cost.

Another object of the invention is to provide a regulator which has special advantages at three phase.

Another object of the invention is to provide a regulator utilizing an Ac capacitor which may be operated at higher voltage and reactive volt-amperes for the same temperature rise of prior art devices.

Another object of the invention is to provide a regulator with lower rms current in the bidirectional switch.

Another object of the invention is to provide a regulator with a low ripple output voltage for easy filtering.

Another object of the invention is to provide a regulator with a simple and reliable control circuit.

Another object of the invention is to provide a regulator circuit operable on three phase which is not phase rotation sensitive.

Another object of the invention is to provide a regulator circuit which has good secondary power factor and good form factor between the secondary load winding current and the Dc output current to thus reduce the secondary transformer volt-ampere requirement.

SUMMARY OF THE INVENTION

The invention may be incorporated in a regulator circuit comprising in combination, first and second input terminals adapted to be energized from an alternating voltage source, first and second output terminals adapted to be connected to a load, first and second reactive means of opposite sign, first means to connect said first reactive means effectively in circuit with said input and output terminals, switch means to connect said second reactive means effectively in circuit with said input and output terminals, and means to control the magnitude and sign of the net reactive impedance of said first and second reactive means by controlling said switch means conduction time.

Other objects and a fuller understanding of the invention may be had by referring to the following description and claims, taken in conjunction with the accompanying drawing.

DETAILED DESCRIPTION

Figure 1:
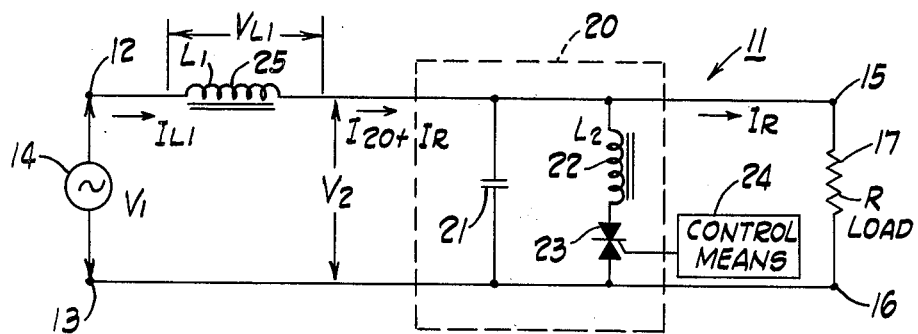
FIG. 1 is a simplified schematic diagram illustrating the basic invention.

FIG. 1 illustrates schematically the basic reactive regulator circuit 11. This regulator 11 is shown on a single-phase basis, but it will be shown later that it has special advantages for regulating Dc power flow with proper three-phase supply interconnections. This regulator circuit of FIG. 1 includes first and second input terminals 12 and 13 adapted to be energized from an alternating voltage source 14 which is shown as having a voltage $V_1$. The regulator also has first and second output terminals 15 and 16 adapted to be connected to a load 17 in this case shown as a resistive load. The regulator also includes reactive means 20 which in this FIG. 1 is shown as a shunt reactance, and it includes a first and second reactive means 21 and 22. The first reactive means 21 is connected in circuit with the input and output terminals, and may be in series but in this FIG. 1 it is shown as being connected in shunt with the output terminals 15 and 16. Switch means 23 is provided to connect the second reactive means 22 in circuit with the input and output terminals. In FIG. 1 this switch means 23 is shown as a bidirectional switch connecting the second reactive means 22 in shunt with the output terminals 15 and 16. The switch means 23 and second reactive means 22 may also be replaced by separate unidirectional switches such as thyristors and one or separate inductances where the inductances are on the same core. A control means 24 controls the switch conduction times during the alternating voltage output cycles such that the magnitude and sign of the net reactive impedance of the first and second reactive means 21 and 22 is controlled. A linear inductance 25 is also part of the reactive means of the regulator 11, and it is connected in circuit with the input and output terminals. In FIG. 1 this is shown as being connected in series between these input and output terminals. This linear inductance 25 is also shown as $L_1$ with the voltage thereacross as $V_{L1}$ and the current therethrough as $I_{L1}$. The voltage at the output terminals 15 and 16 is shown as $V_2$, the current to the resistive load 17 is shown as $I_R$, and the current $I_{L1}$ is also shown as the vector sum of $I_{20} + I_R$ where $I_{20}$ is the current through the reactive means 20.

Figures 2A, 2B:
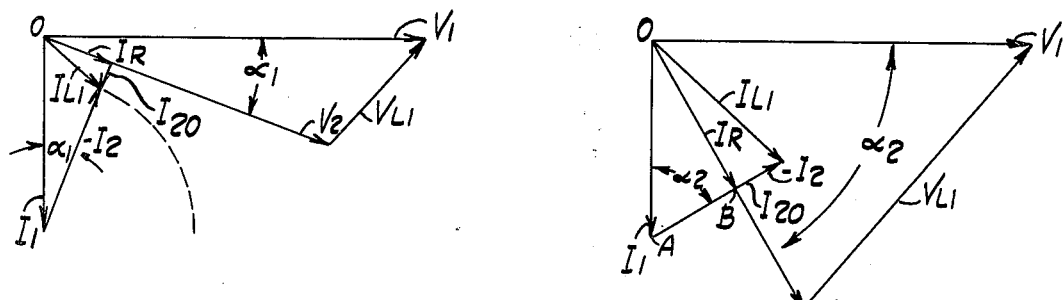
FIGS. 2A and 2B are vector diagrams illustrating the current and voltage relationships in the circuit of FIG. 1.

The vector diagram for the reactive regulator 11 in FIG. 1 is illustrated in FIGS. 2A and 2B for two different load conditions. It can be seen that the vector diagram for this regulator 11 is identical to that of the regulator circuit U.S. Pat. No. 3,668,508 assigned to the common assignee.

Since the inductor L1 in FIG. 1 is a linear element, the mathematical technique of superposition may be applied to determine $I_{L1}(t)$. If $V_1(t)$ is shorted to 0 potential and $V_2(t)$ is then applied to L1, the current $I_2(t)$ would then flow through $L_1$. Alternatively, if $V_2(t)$ is shorted to 0 potential and $V_1(t)$ is applied across L1, the current $I_1$ would then flow through L1. The resultant current $I_{L1}$ would then be the vector difference between the current $I_1$ and $I_2$. Accordingly, $I_1$ and $I_2$ are imaginary currents used for the purposes of explanation. Referring to the schematic and vector diagrams of FIGS. 1 and 2b $$I_1 = \frac{V_1}{WL_1}, \quad I_2 = \frac{V_2}{WL_1} \text{ and let } K = \frac{V_1}{V_2}$$

Since $I_2$ lags $V_2$ by 90° —$I_2$ intersects $V_2$ at a right angle and thus triangle (O A B) is a right triangle the right angle being O B A, therefore $\sin \alpha = \frac{I_R}{I_1}$ or $I_R = I_1 \sin \alpha$ $$\text{OR } I_R = \frac{V_1}{WL_1} \sin \alpha \tag{1}$$

Also segment $(AB)$ of $-I_2 = I_1 \cos \alpha = \frac{V_1}{WL_1} \cos \alpha$

Note that the reactive current $I_{20} = (I_2 - $ segment $(AB))$ $$\text{OR } I_{20} = \left(\frac{V_2}{WL_1} - \frac{V_1}{WL_1} \cos \alpha\right)$$

But $V_1 = KV_2$
Therefore $I_{20} =$

Therefore $I_{20} = \left(\frac{V_2}{WL_1} - \frac{KV_2}{WL_1} \cos \alpha\right) = \frac{V_2}{WL_1}(1 - K \cos \alpha)$ The reactive volt $x$ amperes (VAR) = $I_{20} \cdot V_2$ $$\text{OR reactive VAR} = \frac{V_2^2}{WL_1}(1 - K \cos \alpha) \tag{2}$$

Referring to the equation (1), $I_R = \frac{V_1}{WL_1} \sin \alpha$ $$\text{Watts output} = I_R V_2 = \frac{V_1 V_2}{WL_1} \sin \alpha \tag{3}$$

But $V_1 = KV_2$

Therefore Watts = $\left(\frac{V_2^2}{WL_1}\right)(K \sin \alpha)$ $$\text{Or } \frac{\text{VAR}}{\text{WATTS}} = \frac{(V_2^2/WL_1)(1 - K \cos \alpha)}{(V_2^2/WL_1)(K \sin \alpha)} = \left[\frac{1 - K \cos \alpha}{K \sin \alpha}\right] \tag{4}$$

The VAR/WATTS ratio is a measure of efficiency of the system, the smaller this ratio the more power controlled per reactive volt amperes. The reactive block 20 in FIG. 1 is a reactive element that may be made to conduct an inductive or a capacitive reactive current.

In the vector diagrams of FIGS. 2A and 2B, $I_R$ is that portion of $I_{L1}$ which is in phase with the output voltage $V_2$ and represents the load resistor current. $I_{20}$ is the portion of $I_{L1}$ in quadrature with V2, and this current must flow in the reactive regulator shunt element 20 of FIG. 1. In FIG. 2A, with $\alpha_1$ equal 20°, it can be seen that $I_{20}$ is 90° lagging $V_2$ and the reactive block 20 must look inductive. In FIG. 2B with $\alpha_2$ equal 60°, $I_{20}$ leads $V_2$ by 90° and the reactive means 20 looks capacitive.

Figure 3:
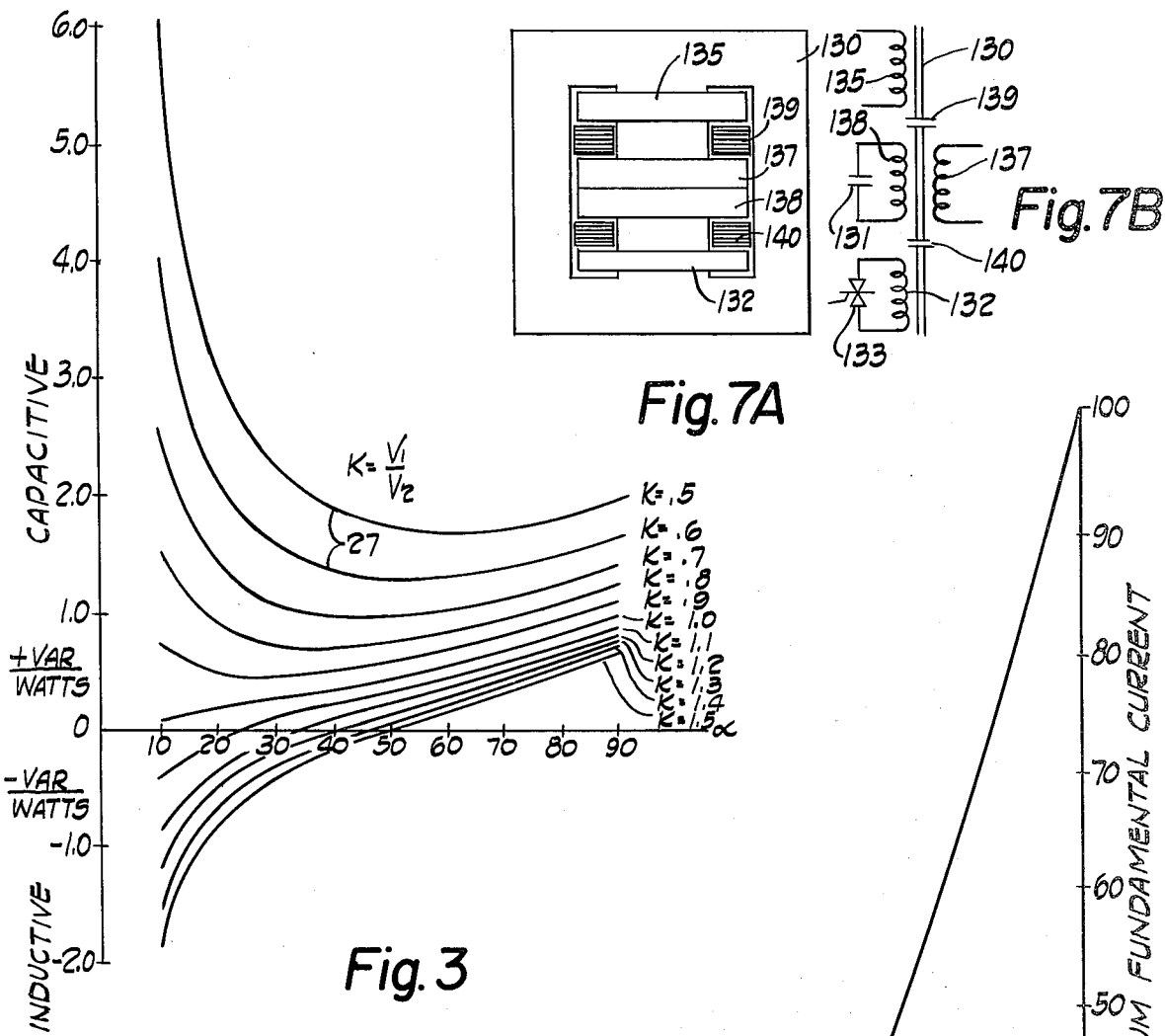
FIG. 3 is a family of curves of the capacitive or inductive ratio of VAR/watts for a constant ratio of input to output voltage.

The family of curves of FIG. 3 illustrates the ratio of VAR (volt ampere reactive) that the reactive means 20 must conduct to the output watts, see equation (4). The positive region of the curves represents capacitive VARs, the negative region represents inductive VARs. K equals $V_1/V_2$, or is the ratio of input to output voltage.

Note that under maximum load, that is $\alpha = 90°$, the reactive means 20 is required to draw capacitive current under all conditions of K. In fact the VARs required are represented by the equation (2) where negative values represent inductive VA and positive terms represent capacitive VA.

Note in the equation (2) that for any value of K as $\alpha$ is increased corresponding to heavier loading the reactive current through 20 becomes more capacitive. Since the sense does not reverse, then it is possible to regulate the output voltage V2 by making $I_{20}$ more capacitive if $V_2$ decreases and less capacitive if $V_2$ increases about a fixed value.

In the regulator circuit of FIG. 1 it will be seen that the triac 23 controls the inductive portion of $I_{20}$. This triac is a controllable switch capable of blocking the $V_2$ voltage through inductance 22 and hence keeping this inductance 22 or $L_2$ out of the circuit without a gate signal on this switch. When the switch 23 is gated on with a pulse from control means 24, it will act like a short circuit until the current tries to reverse. At this point the switch will again block the current through $L_2$ until again gated, and this will be after $V_2$ reverses polarity. By controlling the gating of this switch 23 with respect to $V_2$, $L_2$ can be completely removed from the circuit for maximum capacitive current or coupled to $V_2$ for any degree of the cycle up to full conduction for minimum capacitive current.

Figure 4:
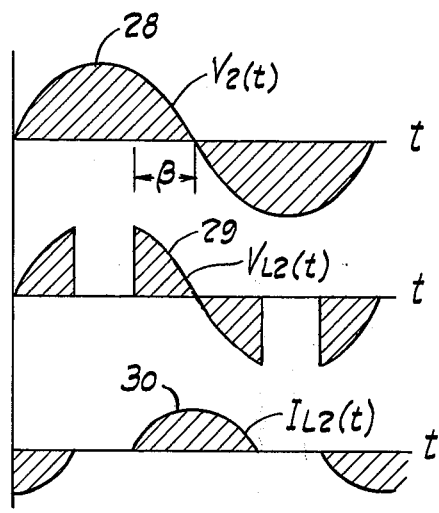
FIG. 4 is a graph of voltage and current relationships for a given firing angle.

FIG. 4 illustrates the wave shapes of the voltage $V_2$ of FIG. 1, the voltage $V_{L2}$ and the current $I_{L2}$ for a $\beta$ of 60°. In FIG. 4 $V_2(t)$ is shown by curve 28, $V_{L2}(t)$ is shown by curve 29, and $I_{L2}(t)$ is shown by curve 30. $\beta$ is the phase angle of advance of the 180° point of the switch 23 gate pulses with respect to $V_2(t)$. It may be seen that as $\beta$ is varied over a range of 90° per half cycle, $I_{L2}$ conduction will be varied over a range of 180°. As $\beta$ increases from the 60° point shown in FIG. 4, the notch in the curve 29 becomes smaller, and the curve 30 becomes closer to becoming continuous and a complete sine wave.

Figure 5:
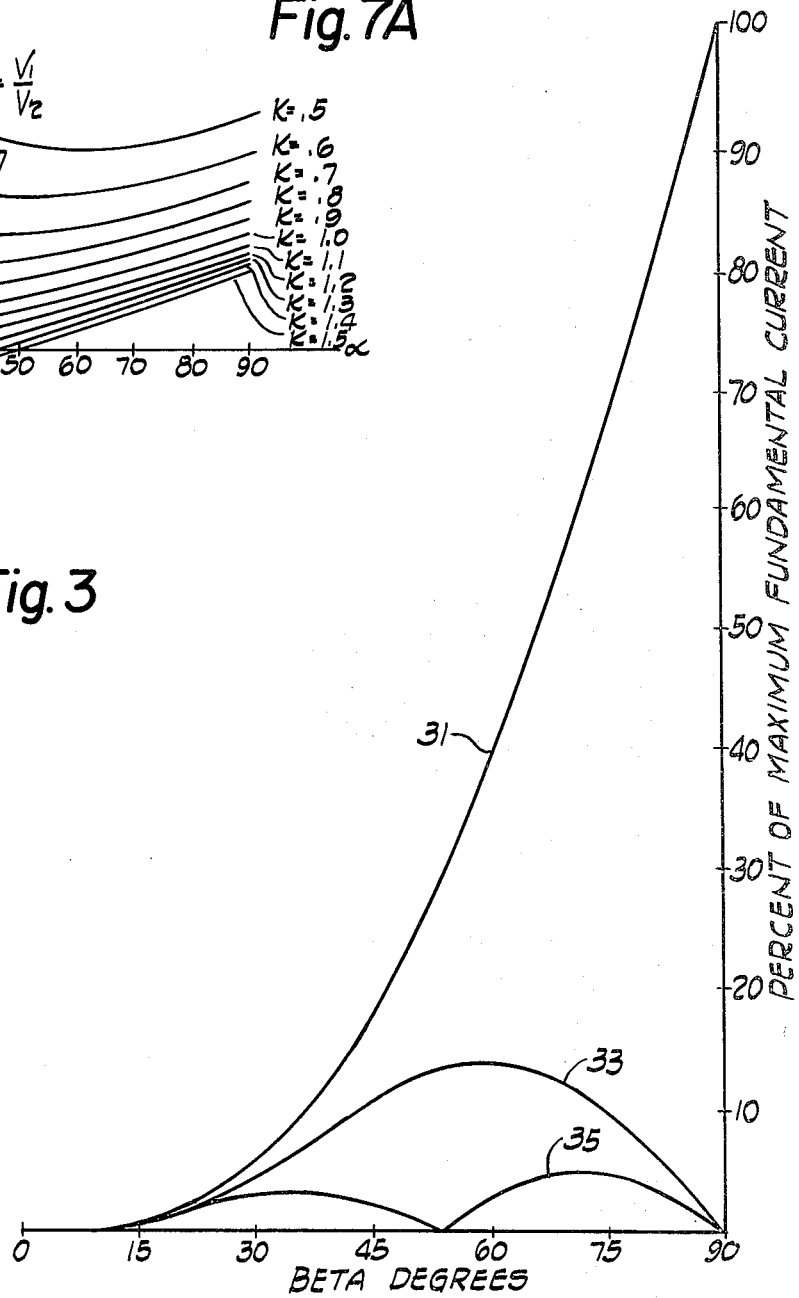
FIG. 5 is a graph of the proportion of fundamental and harmonic current plotted against firing angle.

The graph of FIG. 5 illustrates the magnitude of $I_{L2}$ with respect to its maximum value vs. $\beta$. Curves 31, 33, and 35 plot the fundamental, third and fifth harmonics, respectively. The component of interest in the vector diagrams of FIGS. 2A and 2B would be the fundamental and the regulator circuit 11 operates essentially along this fundamental curve 31. It is capable of operating throughout the complete range of 0° to 90° for $\beta$.

If in FIG. 1 $X_{L2} = X_{C21}/2$, then the current drawn by $X_{L2}$ when switch 23 is closed will be twice the current drawn by $X_{C21}$. Accordingly the current drawn by the reactive means 20 can be varied from 100 percent capacitive to 100 percent inductive by varying $\beta$ from 0 to 90°, respectively. Note the sense of the control function must be to decrease $\beta$ if $V_2$ decreases, since then there is less $I_{L2}$ and more $I_{20}$.

Up to this point the load has been assumed to be a resistor and a system has been illustrated on a single phase basis. If the load were inductive or capacitive, this could be compensated by offsetting the reactive means 20. If, however, the load is non-linear and draws large harmonic currents, the effect would be to distort $V_2(t)$.

DESCRIPTION OF THE PREFERRED EMBODIMENT

Figure 6:
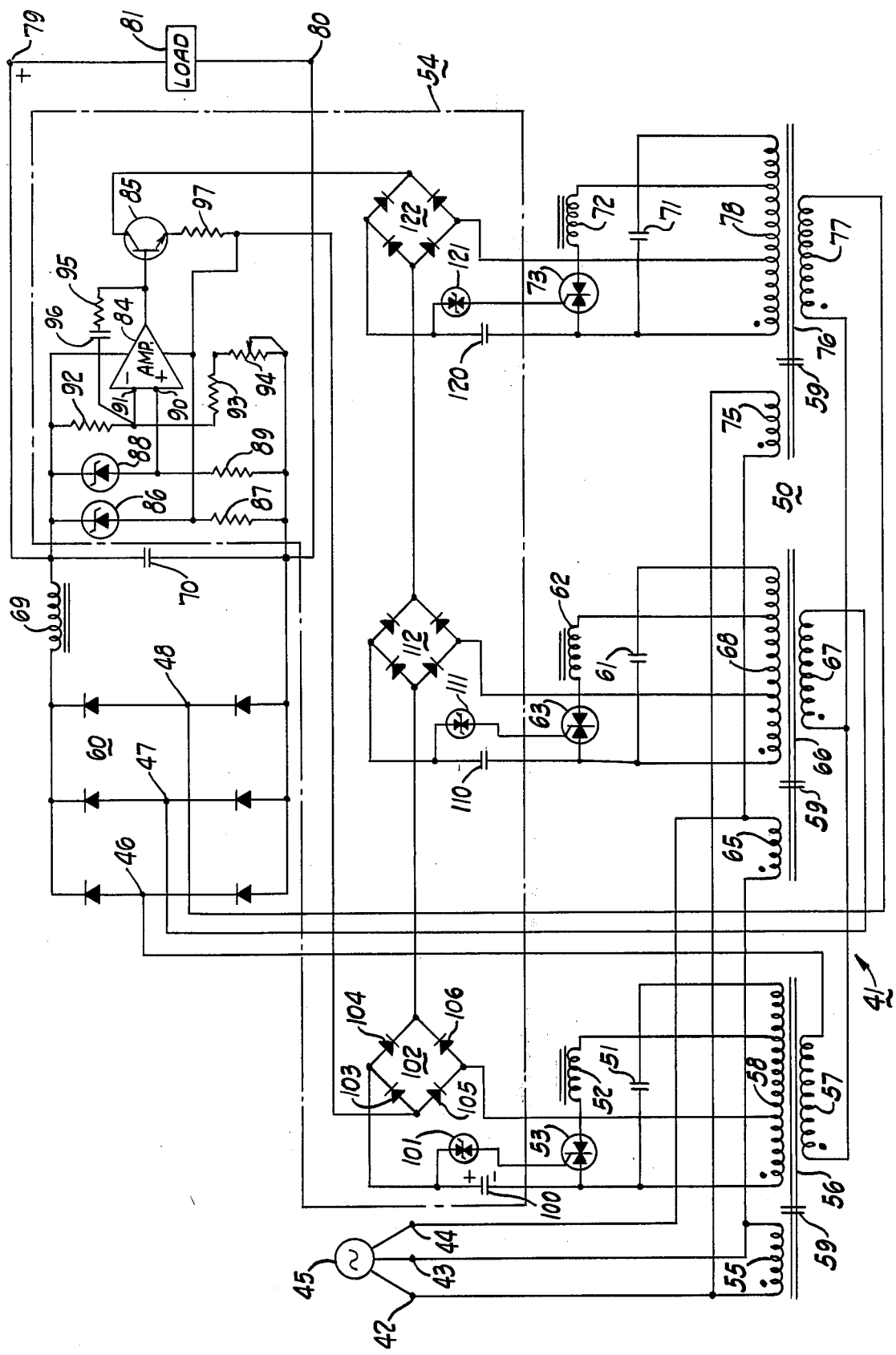
FIG. 6 is a schematic diagram of the preferred embodiment.

FIG. 6 illustrates a complete three-phase reactive regulator 41. This regulator has first, second, and third input terminals 42, 43, and 44 operable from a three-phase alternating voltage source 45. Output terminals 46, 47, and 48 supply a regulated Ac output. Reactive means 50 includes first reactive means 51, 61, and 71, and second reactive means 52, 62, and 72. These first and second reactive means are of opposite sign with the first reactive means being capacitive and the second reactive means being inductive. Switch means 53, 63, and 73 are shown as bidirectionally conducting such as triacs for connecting the second reactive means 52, 62, and 72 in circuit with the input and output terminals. The reactive means 50 also includes leakage reactance transformers 56, 66, and 76, each of which has a primary 55, 65, and 75, respectively, connected in delta to the input terminals 42-44. The leakage reactance transformers have secondaries 57, 67, and 77 connected to the output terminals 46, 47, and 48 in a wye connection. These transformers also have multitapped secondaries 58, 68, and 78 connected to the first reactive means 51, 61, and 71 and the second reactive means 52, 62, and 72. Each of the leakage reactance transformers has a magnetic shunt 59 between the primary and the two secondary windings. This establishes the primary windings 55, 65, and 75 to be in effect a linear inductance equivalent to linear inductance 25 of FIG. 1. This shunt 59 also establishes the secondaries 58, 68, and 78, together with the second reactive means 52, 62, and 72 connectable thereacross by the switches, as a saturable type of inductance. However, in this embodiment the core of the transformers does not saturate during normal regulated operation. Control means 54 is provided to control the regulated output of the regulator 41.

The Ac output at the output terminals 46–48 is shown in this preferred embodiment as being supplied to a three-phase bridge rectifier 60 and through an inductive input filter comprising inductance 69 and optional capacitor 70 to Dc output terminals 79 and 80 to which a Dc load 81 may be connected. The bridge rectifier 60, filter 69 and 70, and Dc load 81 together constitute an Ac load for the Ac output terminals 46–48.

The shunts 59 are set such that the proper leakage reactance, which is inductor 25 in FIG. 1, exists between the line voltages and the output voltages. The reactive means 50 including first reactive means 51 and second reactive means 52 could be placed directly across the secondary 57, but by using a separate winding 58 the capacitors may be operated at a more advantageous voltage with the added advantage of isolation. Capacitor 51 may be connected to the same tap as inductor 52 but by placing a higher voltage on the capacitor the current thereto may be reduced and thus the physical size of the capacitor reduced.

With the delta primary wye secondary connection, and then rectifying the output with a three-phase bridge rectifier, this gives a six-step or quasi square phase load current and the wye connected secondary cancels the third harmonic on each phase. Also all multiples of the third harmonic are removed. This removal of the third harmonic and multiples thereof greatly reduces the distortion of $V_2(t)$ thus producing performance more nearly ideal. The regulator system may also be constructed with a two-times-three-phase bridge connection with secondaries having a 15° zigzag winding. In such case the first harmonic present is the 11th. This gives a 12-step wave rather than 6-step for even better performance. In general this regulator circuit will perform satisfactorily with any regular three-phase connection that excludes the third harmonic.

The control means 54 includes a high-gain amplifier such as operational amplifier 84 and a current amplifier such as transistor 85. A zener diode 86 and resistor 87 supply a voltage regulated operating voltage to the amplifier 84. The zener diode 88 and resistor 89 supply a reference potential to the noninverting input 90 of the amplifier 84. Resistors 92, 93, and rheostat 94 are connected in series across the output terminals 79 and 80. The junction of resistors 92 and 93 is connected to the inverting input 91 of amplifier 84. The output of amplifier 84 is connected to the input or base of transistor 85. The output of amplifier 84 is also fed back to input 91 through resistor 95 and capacitor 96.

Transistor 85 has an emitter load resistor 97 which is connected to control the firing circuit for each of the three switches 53, 63, and 73. The firing circuit for each of the switches is identical and for switch 53 this includes a firing capacitor 100 connected through a threshold device such as back-to-back zener diodes or a diac 101 to the gate and cathode of the switch 53. A bridge rectifier 102 includes four diodes 103, 104, 105, and 106 with the input connected across any portion of the secondary 58 or 57. As shown it is connected across a low voltage portion of secondary 58. In the same circuit arrangement the switch 63 has firing capacitor 110, diac 111, and bridge rectifier 112 and switch 73 has a circuit including firing capacitor 120, diac 121, and bridge rectifier 122.

OPERATION

The control means 54 may be better understood by examining one phase of the system. Looking at transformer 56, firing capacitor 100, and diac 101 form the gate pulsing circuit. The rheostat 94 adjusts the output voltage at output terminals 79 and 80. For any given adjustment of this rheostat 94, there is an essentially constant current charge rate of the firing capacitor 100. The voltage supply for this constant current charge is obtained from a tap on the secondary 58 through the bridge rectifier 102. During the half cycle when the left end of the secondary 58 is negative, current will pass through diode 106, the other two bridge rectifiers 112 and 122 to the collector of transistor 85. This current passes through the transistor 85, resistor 97, and diode 103 to charge the firing capacitor 100 in the polarity shown on FIG. 6. The rate of flow of charge current is then set by the bias on transistor 85 which in turn is set by the rheostat 94. When firing capacitor 100 reaches the firing voltage of the diac 101, the switch 53 will be gated on and capacitor 100 will be discharged. At the end of the half cycle of $V_2(t)$, see FIG. 4, the current in capacitor 100 will reverse flowing through diodes 104 and 105 charging capacitor 100 in the opposite polarity.

For a given bias condition on the transistor 85, the switch 53 will be gated at a fixed angle $\beta$ with respect to the voltage across the capacitor 51. This is effectively the same as $V_{L2}(t)$, curve 29 in FIG. 4. However, $\alpha$ does change with load changes. It is important to note that the charge rate of firing capacitor 100 and thus the angle $\beta$ are set by the constant current flowing through transistor 85 and are not affected by the magnitude of voltage across the capacitor 51 nor secondary 58 nor secondary 57. The voltage taken from the secondary 58 through bridge rectifier 102 serves only to charge the firing capacitor 100 in alternating polarity. In no way is the volts-time integral of the capacitor 51 sensed. Since all three phases are charged from the same current source, the system remains balanced, namely $\beta$ is equal for all three transformers.

The control circuit 54 controls the bias on transistor 85 to maintain a constant output voltage. Zener 88 provides a regulated bias for the high-gain amplifier 84. The circuit regulates to maintain the current through resistor 92 equal to the current through resistor 93 and rheostat 94. The voltage across resistor 92 is very nearly equal to the voltage of the zener 88 so there might be only 0.0015 volts positive on the noninverting input 90 of amplifier 84. If amplifier 84 had a gain of 1,000 this could be 1.5 volts at the output of amplifier 84. This is a practically zero input voltage and hence practically zero current in the amplifier 84. Accordingly the current through resistor 92 is a constant. If the output voltage increases, for example, by decrease of output load current, the current through resistor 93 becomes larger than that through resistor 92 and the output of amplifier 84 becomes more positive biasing transistor 85 further into conduction. This increases the charge current to the firing capacitors 100, 110, and 120. Increasing the angle $\beta$ with the result that the reactive means 20 or 50 looks more inductive in its net reactive impedance. This in turn lowers the output voltage and voltage regulation is achieved. This is just one means of controlling $\beta$, and other types of phase shifting circuits will work equally well. The feedback capacitor 96 across amplifier 84 provides a roll-off frequency to prevent high frequency response, thus eliminating bunting.

Figure 8:
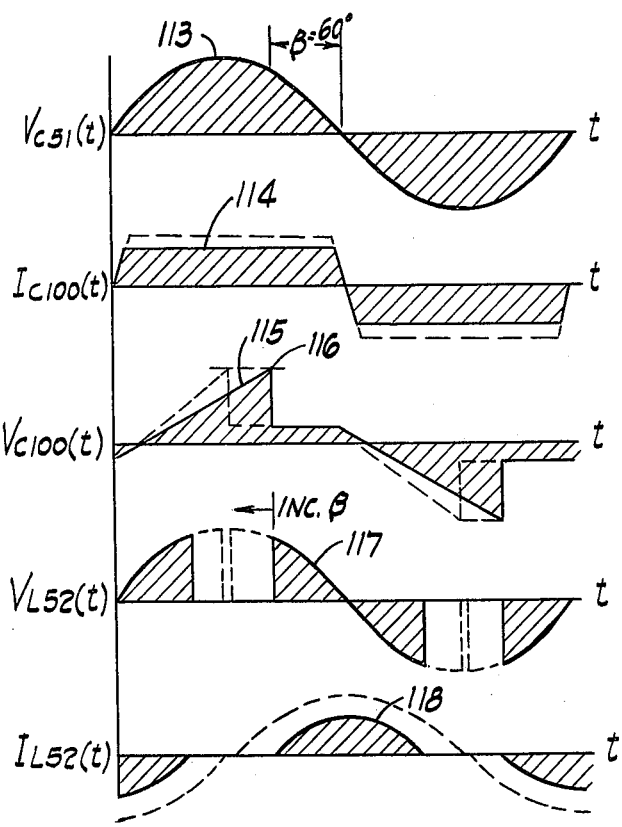
FIG. 8 is a graph of voltage and current relationships in the preferred embodiment.

FIG. 8 illustrates the wave shapes of the gating circuits for one phase such as transformer 56. Curve 113 is the voltage of the capacitor 51, curve 114 is the charging current through the firing capacitor 100 with the flat top of this wave shape set by the bias on transistor 85. Curve 115 is the wave shape of the voltage on the firing capacitor 100 with triggering of the switch 53 at a point 116 when the voltage level of the diac 101 is reached. Curve 117 is a curve of the voltage across the second reactive means 52 and curve 118 is a curve of the current through the second reactive means 52.

Figures 7A, 7B:
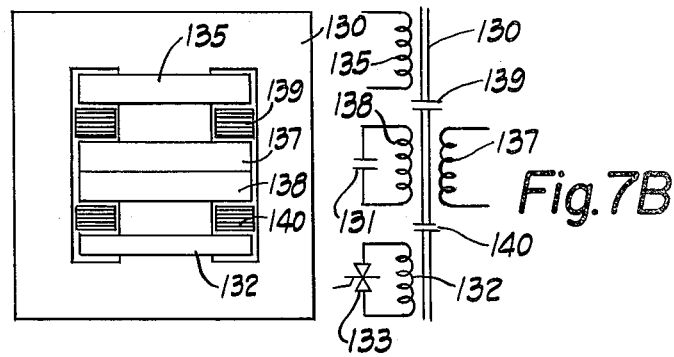
FIGS. 7A and 7B are pictorial and schematic diagrams of a modification of the inductive reactance means.

The invention has been incorporated in alternative structures such as that shown in FIGS. 7A and 7B. Here a core 130 includes a primary winding 135, secondary windings 137 and 138 on another part of the core spaced by a magnetic shunt 139. The second reactive means 132 is also on the same core 130 but spaced by a magnetic shunt 140. The switch means 133 is connected across the second reactive means 132. The first reactive means, namely the capacitor 131, is connected across the secondary 138. Three such transformers as shown in FIG. 7A are therefore required for the three-phase system of FIG. 6. This transformer of FIG. 7 therefore incorporates the second reactive means 52 on the same core. The second shunt 140 and the extra winding 132 together act to produce the second reactive means equivalent to reactive means 22 in FIG. 1. When the switch 133 is gated on shorting the winding 132 all secondary flux is forced to pass through the second set of shunts 140 producing the effect of placing the inductor in parallel with the capacitor 131. This type of construction has advantages for lower KVA units, but has shortcomings of requiring an extremely long lamination window. Another alternative is to use one single three-phase transformer plus a three-phase reactor, the reactor taking the place of the linear inductance 25 of FIG. 1.

Figure 9:
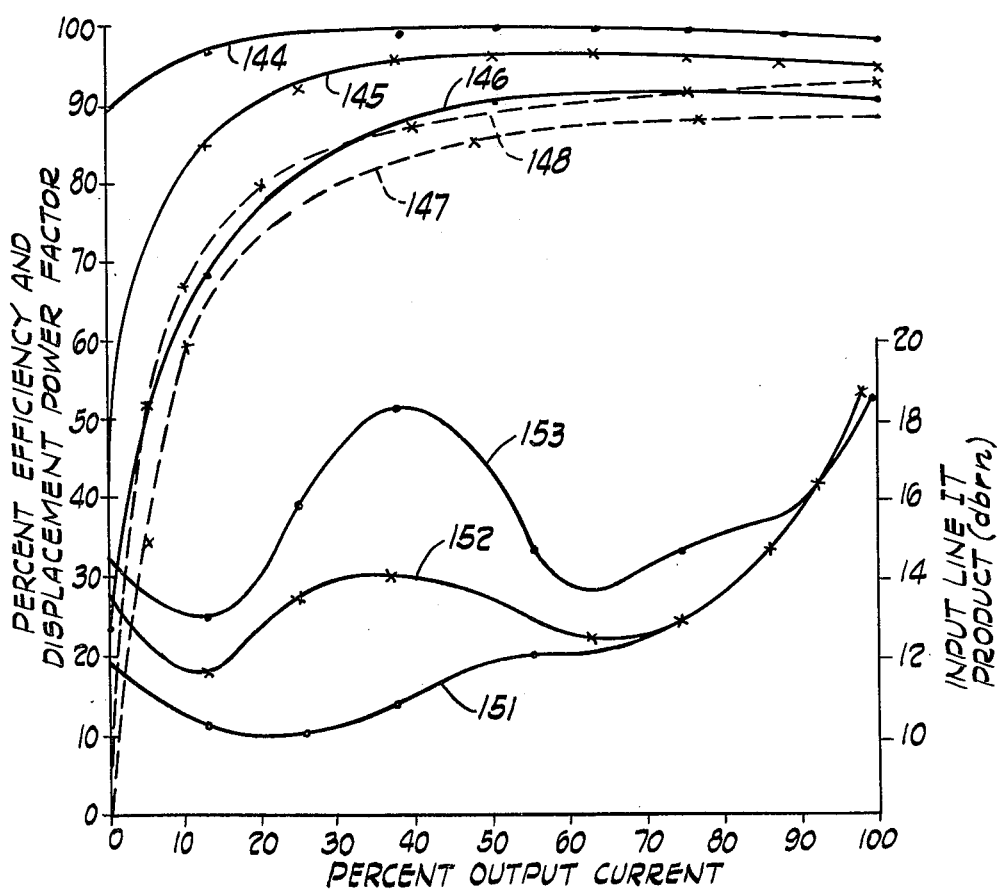
FIG. 9 is a graph of efficiency, power factor and harmonic disturbances plotted against output current, for one particular circuit.

The foregoing regulator circuit, primarily the reactive regulator circuit 41, of FIG. 6, has a number of definite advantages over the prior art. The regulator has excellent primary power factor. This is shown in FIG. 9 in the series of curves 144, 145, and 146 for the low, normal and high voltage inputs, respectively, of 184, 208, and 220 volts Ac input. This is for the circuit actually constructed in accordance with FIG. 6 which had 154 volts Dc output at 10 amperes maximum. Since the power factor of the regulator circuit 41 may be controlled by adjusting K, the ratio of $V_1$ to $V_2$, practical power factors of greater than 90 percent at full load may be obtained. High efficiency of this system is also obtainable as shown by curve 147. This is for the actual observed efficiency of the 154 volt Dc 10 ampere circuit constructed. One phase of a full size transformer was constructed for a regulator circuit which would be 20 times larger or 200 amperes output at 154 volts. This results in the calculated efficiency curve 148 shown in FIG. 9. This is higher efficiency, greater than 90 percent at full load because larger transformers inherently have greater efficiency.

The Ac capacitor 51 of FIG. 6 has applied to it an Ac capacitor voltage which is very nearly sinusoidal, and this results in the extremely low Ac line telephone influence factor TIF. FIG. 9 illustrates the three curves 151, 152, 153 for 184, 208, 220 volt, respectively, Ac input to the regulator 41. This was for 154 volt Dc output at 10 amperes maximum. With 1,540 watts and an IT product of only 19 this is about 0.0129 IT product per watt output, or decibels above a reference noise. This is extremely low and means that the harmonics reflected back into the Ac line would be very low to not interfere with the telephone communications, at least to a much lesser extent than a prior art.

The Ac capacitor 51 of FIG. 6 operates essentially with a sinusoidal current. The ratio of capacitor volt amperes to output watts is 0.8 vs. 1.5 for the square wave operation of the prior art ferroresonant regulators. Secondly, the Ac capacitors may be operated at a higher potential without exceeding their temperature rise limitations because of the reduced RMS current produced by sinusoidal operation. Third the reduction of capacitor volt amperes results in reduction of capacitor winding volt amperes. This results in a transformer size reduction with improved efficiency.

Another advantage is low RMS current in the triacs 53, 63, 73, and the second reactive means 52, 62, and 72, since this second reactive means is in the circuit to form an inductive current rather than to simulate ferroresonant saturation. The form factor of this current is much better producing a lower current through inductor 52 and triac 53 for equal output watts.

Another advantage of the circuit is low ripple output voltage for easy filtering. The voltage applied to the three-phase output bridge 60 is very nearly identical to a three-phase control system at full conduction angle. This produces a 360 Hz. output ripple of approximately 14 percent peak to peak before filtering. Another advantage is the simple control scheme. The control means 54 is quite simple compared to the complex circuit required by phase control systems to achieve line noise immunity.

Another advantage is the high reliability of the regulator circuit 41. This goes hand in hand with the simplicity of the control circuit and also the fact that most of the main power components are high reliability magnetic components.

Another advantage is that the regulator circuit 41 is not phase rotation sensitive. Since complete symmetry exists within the triac gating circuit of FIG. 6, input voltage phase rotation reversal will have no effect on circuit performance. This is not true of many phase control thyristor systems.

Another advantage is good secondary power factor. Since the regulator 41 will operate into an inductive Dc filter consisting of inductor 69, the conduction time of the secondary load windings 57, 67, and 77 is 120° of each half cycle. This produces a good form factor between RMS winding current and Dc output current reducing secondary transformer volt amperes. Ferroresonant regulators must operate into capacitive Dc filters producing poor form factors. Since this regulator circuit may operate into the inductor 69, the capacitor 70 of the filter may be eliminated if desired. This permits deletion of all Dc filter capacitors and their associated fuses and alarm circuitry.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A regulator circuit comprising, in combination, first and second input terminals adapted to be energized from an alternating voltage source, first and second output terminals adapted to be connected to a load, first and second reactive means of opposite reactive sign, first means to connect said first reactive means effectively in circuit with said input and output terminals, switch means to connect said second reactive means effectively in circuit with said input and output terminals, said second reactive means being in the order of one-half the impedance of said first reactive means, and means to control the percentage of a complete cycle that said switch means is conducting to control the reactive current through said second reactive means to combine with the current through said first reactive means to make the total effective reactive current for each complete cycle either inductive or capacitive to control the output of said regulator circuit.

2. A regulator circuit as set forth in claim 1, wherein said switch means connects said second reactive means effectively in parallel with said output terminals.

3. A regulator circuit as set forth in claim 1, wherein said first means connects said first reactive means effectively in parallel with said output terminals.

4. A regulator circuit as set forth in claim 1, wherein said switch means conducts current bidirectionally for conduction on both positive and negative half cycles of the alternating voltage input.

5. A regulator circuit as set forth in claim 1, including an inductive reactance connected in series between said input and output terminals.

6. A regulator circuit as set forth in claim 1, wherein said control means regulates one of output voltage and current by controlling the phase angle of the output voltage with respect to the alternating voltage input with decreasing power as the phase angle is advanced.

7. A regulator circuit as set forth in claim 1, including third reactive means connected in series between said input and output terminals.

8. A regulator circuit as set forth in claim 1, wherein said first reactive means is capacitive and wherein said second reactive means is inductive.

9. A regulator circuit as set forth in claim 8, including third reactive means connected in series between said input and output terminals.

10. A regulator circuit as set forth in claim 9, wherein said connection means connects said first and second reactive means effectively in parallel with said output terminals.

11. A regulator circuit as set forth in claim 10, wherein said third reactive means is a substantially linear inductance.

12. A regulator circuit as set forth in claim 11, wherein said second and third reactive means are included as a part of a leakage reactance transformer.

13. A regulator circuit as set forth in claim 11, wherein said second and third reactive means are on physically separate core means.

14. A regulator circuit as set forth in claim 11, wherein said switch means is bidirectionally conductive.

15. A regulator circuit as set forth in claim 14, wherein said switch means is connected in series with said second reactive means.

16. A regulator circuit as set forth in claim 1, including a third input terminal for energization of the input terminals from a three-phase source.

17. A regulator circuit as set forth in claim 16, including a third output terminal for supplying a regulated output to a three-phase load.

18. A regulator circuit as set forth in claim 1, including a rectifier connected to said output terminals to supply a regulated output to a Dc load.

19. A regulator circuit as set forth in claim 18, including an amplifier having an input connected to amplify changes in said Dc output, a firing capacitor, means connecting said firing capacitor to be charged at a variable rate according to the changing output of said amplifier, and a threshold device connected between said firing capacitor and said switch means to cause conduction of said switch means upon the voltage of said firing capacitor reaching the threshold of said device.

20. A regulator circuit as set forth in claim 7, wherein said third reactive means is a primary winding on a leakage reactance transformer, said second reactive means is a secondary winding on said leakage reactance transformer, and a magnetic shunt between said primary and secondary windings.

21. A regulator circuit as set forth in claim 1, wherein said control means controls the magnitude of the average net inductive or capacitive reactance to control the output of said regulator circuit.

* * * * *